(12) United States Patent
Weinheimer et al.

(10) Patent No.: US 6,460,560 B1
(45) Date of Patent: Oct. 8, 2002

(54) LOW PROFILE INFLATION VALVE

(75) Inventors: Jacek M. Weinheimer, Treasure Island; Lyman W. Fawcett, Jr., St. Petersburg, both of FL (US)

(73) Assignee: Halkey-Roberts Corporation

( * ) Notice: Subject to any disclaimer, the term of this patent is extended or adjusted under 35 U.S.C. 154(b) by 0 days.

(21) Appl. No.: 09/493,309

(22) Filed: Jan. 28, 2000

(51) Int. Cl.$^7$ ................................................ F16K 15/20
(52) U.S. Cl. .................... 137/232; 137/854; 137/234.5; 446/224; 441/41
(58) Field of Search ................................. 137/854, 232, 137/223, 234.5, 454.5; 446/224; 441/41

(56) References Cited

U.S. PATENT DOCUMENTS

| | | | |
|---|---|---|---|
| 2,679,857 A | 6/1954 | Russell | 137/232 |
| 2,701,579 A | 2/1955 | Hasselquist | 137/223 |
| 2,736,333 A | 2/1956 | Hancox | 137/232 |
| 2,839,073 A | 6/1958 | Marsh | 137/232 |
| 2,977,973 A | 4/1961 | Chakine | 137/223 |
| 3,068,494 A | 12/1962 | Pinkwater | 5/348 |
| 3,133,696 A * | 5/1964 | Mirardo | 137/223 |
| 3,429,330 A | 2/1969 | Bogossian et al. | 137/223 |
| 3,785,395 A | 1/1974 | Andreasson | 137/223 |
| 3,995,653 A | 12/1976 | Mackal et al. | 441/41 |
| 4,114,230 A * | 9/1978 | MacFarland | 137/223 X |
| 4,478,587 A | 10/1984 | Mackal | |
| 4,579,141 A | 4/1986 | Arff | 137/223 |
| 4,766,628 A | 8/1988 | Walker | 5/449 |
| 4,823,831 A * | 4/1989 | Jaw | 137/223 |

(List continued on next page.)

FOREIGN PATENT DOCUMENTS

| | | | | |
|---|---|---|---|---|
| CA | 1146439 | * | 5/1983 | 137/854 |
| DE | 2548297 | * | 5/1976 | 137/232 |
| EP | 0393594 | * | 10/1990 | 137/232 |
| GB | 2950825 | * | 7/1980 | 137/232 |

*Primary Examiner*—John Rivell
*Assistant Examiner*—Meredith H. Schoenfeld
(74) *Attorney, Agent, or Firm*—Holland & Knight LLP

(57) ABSTRACT

A low profile inflation valve intended to be installed with an article to inflated with air, water or other fluid. The valve of the invention comprises a valve body which is sealed, such as by an adhesive, heat-sealing or RF sealing, to a corresponding opening in the article to be inflated. The body comprises a generally circular cylindrical configuration with internal threads for receiving a cap. The cap correspondingly comprises a circular cylindrical configuration having exterior threads for threaded engagement into the valve body. A flapper is affixed to the underside of the cap and functions as a one-way valve to prevent fluid from within the article from escaping therefrom when the cap is partially threaded within the body and yet which allows inflation of the article. Moreover, full tightening of the cap within the body sealingly entraps the flapper between the cap in a lower portion of the body so as to create an airtight seal and prevent further inflation (or deflation) of the article. A dust cap is provided for covering the cap during use of the article after inflation so as to prevent dust and other debris from contaminating the interior of the cap and otherwise obstructing or interfering with the proper sealing of the flapper to the underside of the cap. Preferably, the dust cap is tethered to the cap by means of a tether having a living hinge and the cap is tethered to the body by means of another tether which allows the cap to be fully removed from the body and moved off to the side during deflation of the article.

13 Claims, 6 Drawing Sheets

U.S. PATENT DOCUMENTS

| | | | |
|---|---|---|---|
| 4,924,899 A * | 5/1990 | Po ............................. | 137/232 |
| 4,927,397 A | 5/1990 | Yeager ........................ | 441/41 |
| 5,083,581 A * | 1/1992 | Jaw ............................ | 137/232 |
| 5,119,842 A * | 6/1992 | Jaw ............................ | 137/232 |
| 5,144,708 A * | 9/1992 | Pekar ......................... | 137/223 |
| 5,203,831 A | 4/1993 | Lind et al. .................... | 137/1 |
| 5,211,782 A * | 5/1993 | Thelen .................. | 137/232 X |
| 5,341,833 A * | 8/1994 | Davis ......................... | 137/232 |
| 5,343,889 A * | 9/1994 | Jaw ............................ | 137/232 |
| 5,351,710 A * | 10/1994 | Phillips ...................... | 137/223 |
| 5,351,711 A * | 10/1994 | Peter .......................... | 137/232 |
| 6,009,895 A * | 1/2000 | Wass et al. ................. | 137/223 |
| 6,089,251 A * | 7/2000 | Pestel ...................... | 137/234.5 |
| 6,138,711 A * | 10/2000 | Lung-Po ................ | 137/223 X |
| 6,164,314 A * | 12/2000 | Saputo et al. .............. | 137/232 |
| 6,237,621 B1 * | 5/2001 | Chaffee ...................... | 137/223 |

* cited by examiner

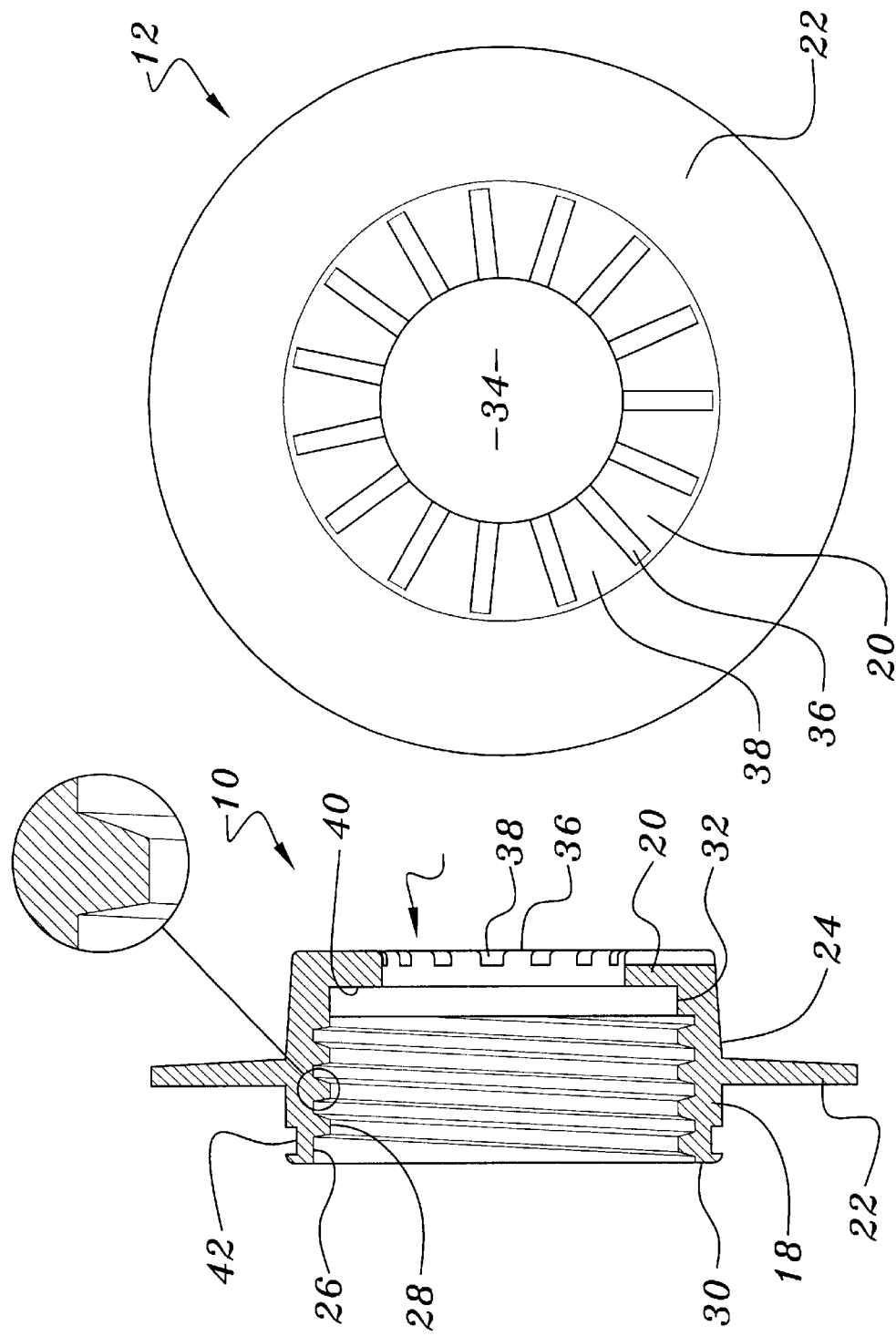

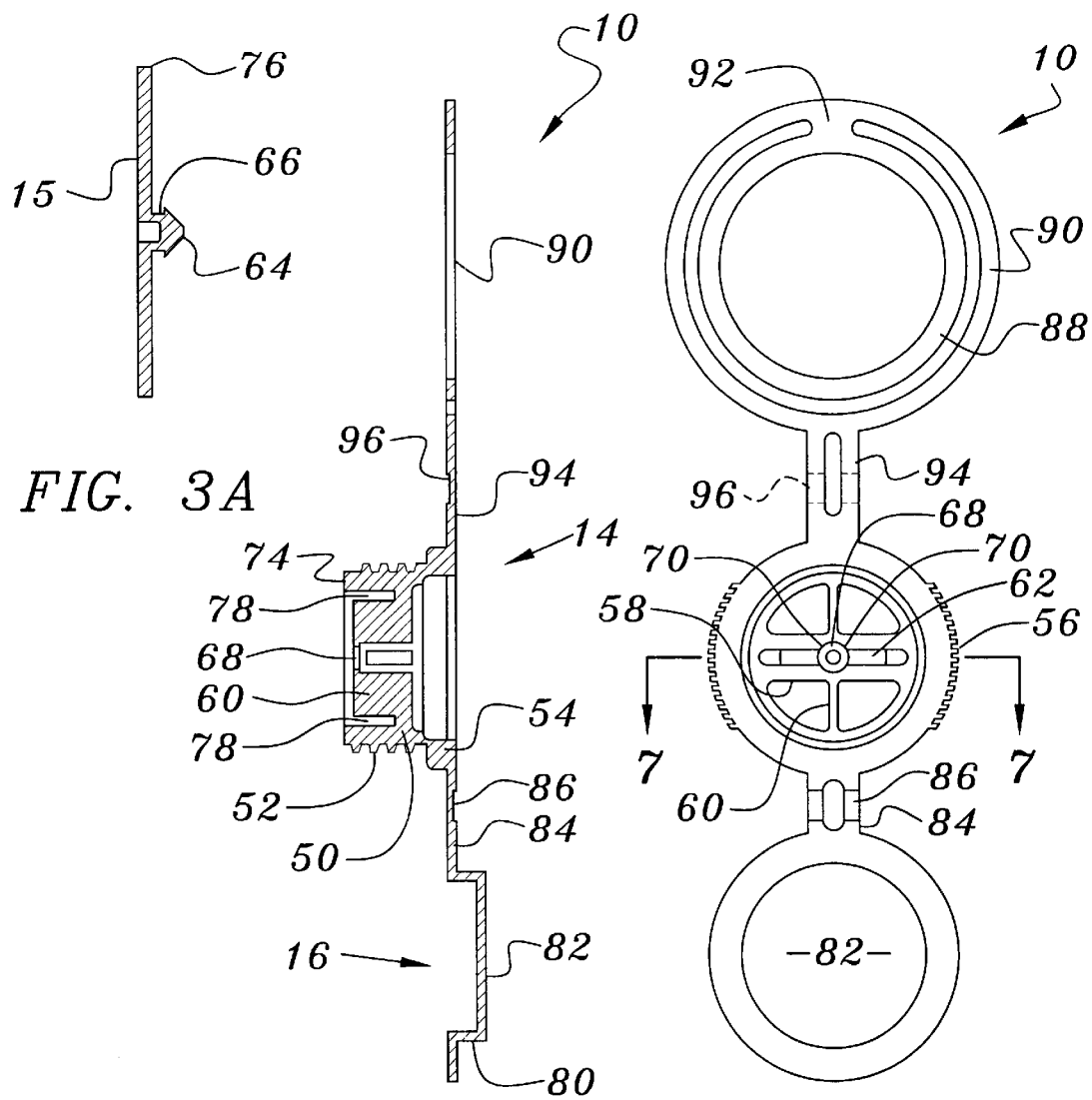

LOW PROFILE INFLATION VALVE

BACKGROUND OF THE INVENTION

1. Field of the Invention

This invention relates to inflation valves. More particularly, this invention relates to inflation valves designed to operate in low-pressure environments for permitting the inflation or deflation of an article to which the valve is connected. Further, other embodiments of this invention relate to relief valves for relieving pressure within an article.

2. Description of the Background Art

Presently, there exists a multitude of inflation valves designed to be connected to an article for inflating or deflating the same. Typical prior art valves comprise an outer flange which is designed to be sealed to an opening in the article to be inflated and a one-way or check valve mechanism that allows the article to be inflated with a fluid such as air or water without back flow through the valve during inflation due to the one-way or check valve mechanism of the valve itself. In some prior art valves, the one-way valve mechanism is mounted to the body of the valve whereas in other prior art valves, the valve mechanism is mounted within the cap itself For example, U.S. Pat. No. 2,701,579 discloses a low-pressure one-way valve for inflatable articles having an axially movable plug which can be moved to a filling position for inflating the article and to a sealing position for preventing deflation of the article. U.S. Pat. No. 3,068,494 discloses an inflation valve which cooperates with an inflation bladder having a duckbill valve connected interially within the article to be inflated such that the duckbill valve functions as a one-way check valve to prevent back flow of the air out of the article during inflation. U.S. Pat. No. 2,736,333 discloses a low pressure sealing valve having a sealing flapper mounted to the underside of a cap that fits within a valve body, wherein the flapper serves as a one-way check valve during inflation but may be burped to permit deflation by means of a mechanical lever which unseats it from the underside of the cap. U.S. Pat. No. 2,839,073 discloses a simple inflation valve wherein the underside of the body includes a cut which allows inflation but retards deflation. U.S. Pat. No. 3,429,330 discloses a one-way valve intended to be inserted within a tube which then may be secured to an article to inflated wherein the one-way operation of the valve is accomplished by means of a spring-loaded plunger having a head portion which extends from a body portion in such a manner that upon exertion of pressure upon the spring-loaded plunger the valve moves to an open position whereas without such pressure the head seals against the body to prevent deflation of the article. U.S. Pat. No. 3,995,653 discloses an inflation valve having a flapper mounted to the underside of a cap which threads onto a body, with the body including a flange for allowing connection to the article to being inflated. The flapper functions as a one-way valve to permit inflation of the article while precluding deflation due to back flow. Moreover, the flapper valve may be sealed between the body and the cap upon full tightening of the cap within the body thereby preventing any further inflation (or deflation) of the article. U.S. Pat. No. 4,478,587 discloses an inflation valve, commonly used in inflatable articles such as boats, wherein the one-way valve mechanism is mounted within a cap and includes a spring-loaded plunger configuration that may be cocked in a fully opened position allowing deflation and uncocked to a closed position whereupon the valve operates as a one-way check valve during inflation. U.S. Pat. No. 4,579,141 discloses an inflation valve containing a flapper diaphragm carried by an insert mounted within the valve body. U.S. Pat. No. 4,766,628 discloses an inflation valve having a one-way valve mechanism wherein such mechanism comprises a spring-loaded plunger that is operable in a manner similar to U.S. Pat. No. 4,478,587 described above. U.S. Pat. No. 5,203,831 discloses an inflation valve comprising a cap mounted within a body wherein the body supports a flapper for one-way flow during inflation of the article. U.S. Pat. No. 4,927,397 discloses an inflation valve having a one-way check valve mechanism mounted to an insert affixed to the valve body, wherein the one-way valve mechanism comprises a spring-loaded, conically-shaped seal. U.S. Pat. No. 3,785,395 discloses an air valve having a flapper that can be tilted in a non-sealing position allowing deflation of the article. U.S. Pat. No. 2,679,857 discloses an inflation valve having a sealing disk which is urged against a valve seat within the body of the valve thereby allowing inflation but precluding deflation unless the inflation disk is manually forced away from the valve seat Unfortunately, many of these prior art inflation valves are expensive to manufacture and assemble, and therefore have limited application.

Similar to inflation valves, there presently exist many type of relief valves designed to relive pressure within an article. Due to their particular design, many of such relief valves are difficult to manufacture and assemble. Therefore they are too costly for use in low-cost articles such as inflatable mattresses where it would otherwise be desirable to relive pressure in the mattress to adjust the hardness or softness of the mattress after inflation.

Therefore, it is an object of this invention to provide an improvement which overcomes the aforementioned inadequacies of the prior art devices and provides an improvement which is a significant contribution to the advancement of the inflation valve art.

Another object of this invention is to provide an inflation valve for low pressure applications such as the inflation or deflation of an inflatable article such as an inflatable boat, personal floatation device, or a waterbed.

Another object of this invention is to provide an inflation valve for an inflatable article wherein the valve cap includes a one-way check valve mechanism that allows inflation but precludes deflation of the article unless the cap is removed from the body of the valve.

Another object of this invention is to provide a one-way inflation valve having a low profile design wherein the one-way valve mechanism forms a part of the cap and wherein the cap threadably engages almost fully within the body of the valve so as to achieve a substantially flush configuration with the valve body and hence, with the article to which the valve is to be connected.

Another object of this invention is to provide an inflation valve having a low profile design as described above that includes means of fully tightening the cap into position to capture the one-way flapper between the cap and the valve body thereby precluding any further inflation (or deflation) of the article.

Another object of this invention is to provide a low profile one-way inflation valve wherein the cap thereof includes a slot to facilitate the use of a coin or other tool to fully tighten the cap into position or for loosening the cap once tightened thereby obviating the need for the cap to include a significantly protruding portion that may be grasped by a person's hand.

Another object of this invention is to provide an inexpensive relief valve capable of being implemented in low cost articles for relieving pressure within the articles.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a low profile inflation valve intended to be installed with an article to inflated with air, water or other fluid. The valve of the invention comprises a valve body which is sealed, such as by an adhesive, heat-sealing or RF sealing, to a corresponding opening in the article to be inflated. The body comprises a generally circular cylindrical configuration with internal threads for receiving a cap. The cap correspondingly comprises a circular cylindrical configuration having exterior threads for threaded engagement into the valve body. A flapper is affixed to the underside of the cap and functions as a one-way valve to prevent fluid from within the article from escaping therefrom when the cap is partially threaded within the body and yet which allows inflation of the article. Moreover, full tightening of the cap within the body sealingly entraps the flapper between the cap in a lower portion of the body so as to create an airtight seal and prevent further inflation (or deflation) of the article. A dust cap is provided for covering the cap during use of the article after inflation so as to prevent dust and other debris from contaminating the interior of the cap and otherwise obstructing or interfering with the proper sealing of the flapper to the underside of the cap. Preferably, the dust cap is tethered to the cap by means of a tether having a living hinge and the cap is tethered to the body by means of another tether which allows the cap to be fully removed from the body and moved off to the side during deflation of the article.

An important feature of the valve of the invention is its low profile design. The cap is configured to threadably engage almost fully into the body such that only a protruding upper edge of the cap extends from the body itself. Hence, the cap is substantially flush with the body once fully tightened into position. Moreover, the cap includes at least one web having a coin slot that facilitates fill tightening of the cap within the body after inflation and allows convenient loosening of the cap from the body for deflating the article.

The low profile design of the valve of the invention allows the valve to be utilized in connection with a larger variety of inflatable articles than could be achieved by prior art valves as described above. Moreover, the design of the invention is such that it can be economically manufactured and assembled at costs significantly lower than known prior art valves having similar features.

The invention further comprises various embodiments of a relief valve having a design that is very economical to manufacture and assemble and which therefore can be implemented in low cost articles. For example, once such implementation may include an inflation mattress for adjusting the softness or firmness of the mattress once inflated.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirt and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is a diametrical cross-sectional view of the valve body and FIG. 2A is a bottom view thereof illustrating the generally circular cylindrical configuration thereof;

FIG. 3 is a diametrical cross-sectional view of the cap and the dust cap of the valve of the invention illustrating the cross-sectional configuration thereof and FIG. 3A is an enlarged cross-sectional view of the flapper that is connected to the bottom of the cap;

FIG. 4 is a top elevational view of the cap and dust cap of the valve of the invention;

Similar reference characters refer to similar parts throughout the several views of the drawings.

DETAILED DESCRIPTION OF THE PREFERRED EMBODIMENT

Figure 1:
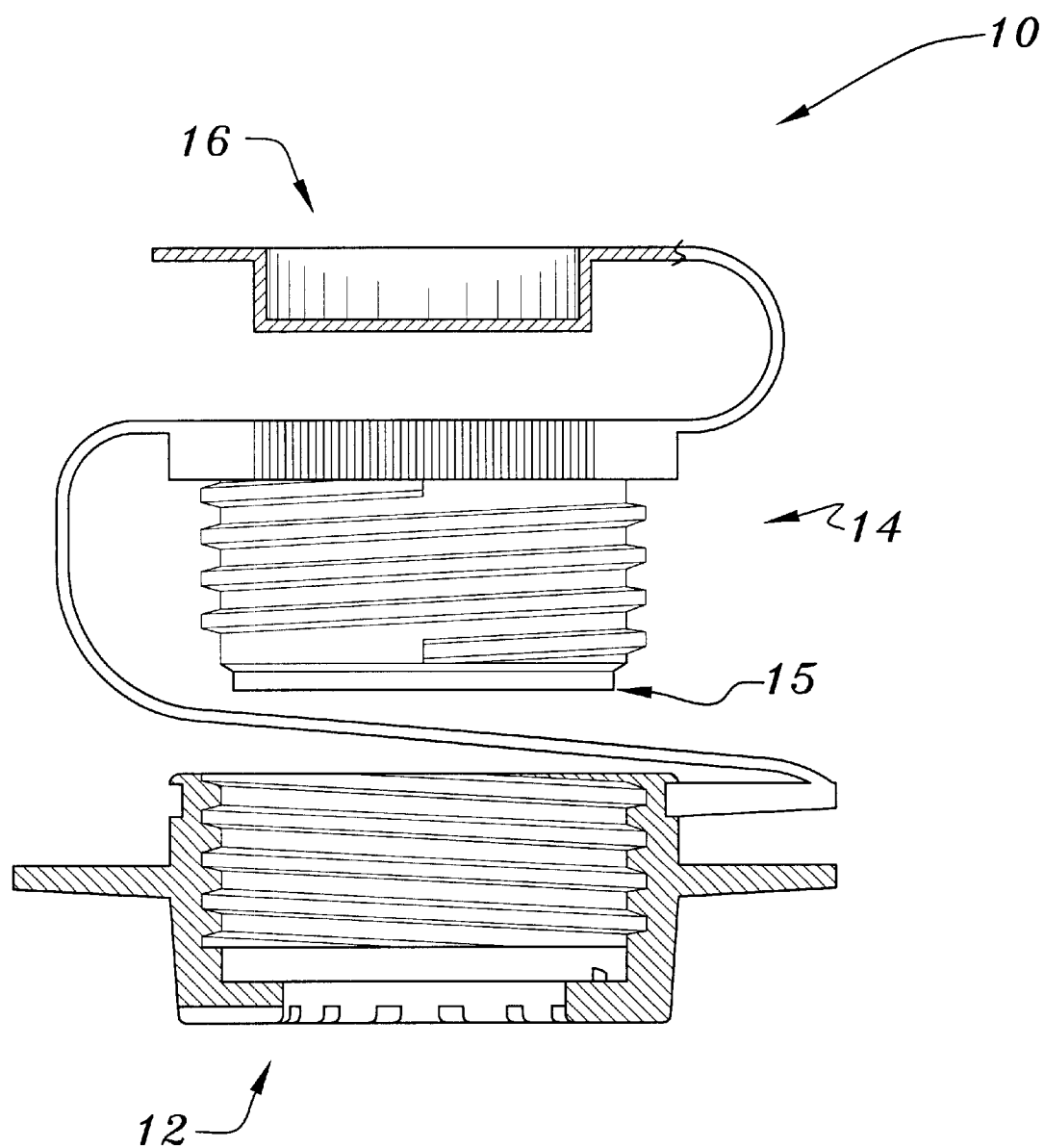
FIG. 1 is an assembly drawing of the low profile valve of the invention, partially exploded, illustrating the cap that threadably engages into the body of the valve and the dust cap for removable covering of the cap during non-use.
Figures 5, 6, 7:
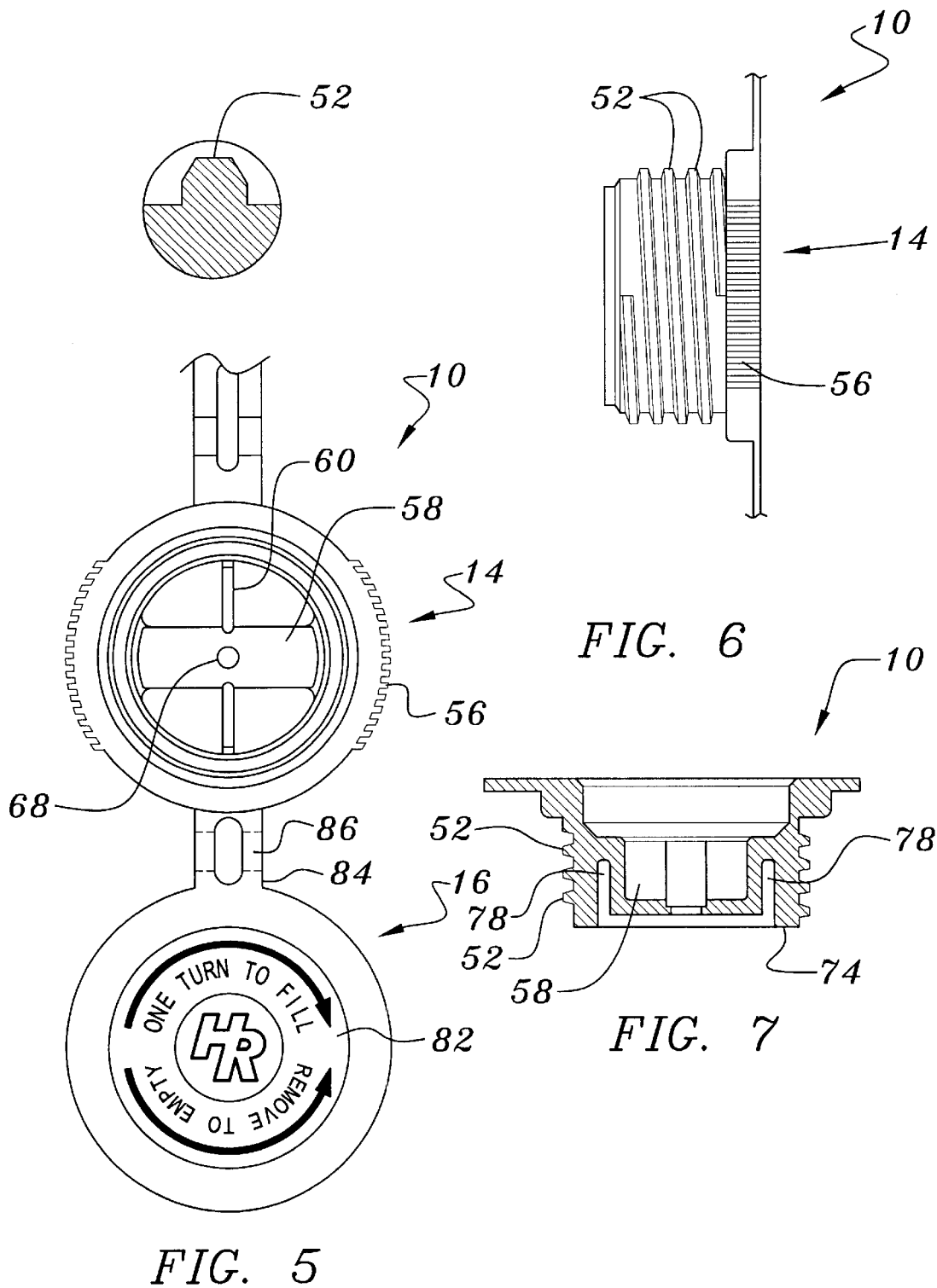
FIG. 5 is a bottom elevational view of the cap and dust cap of the valve of the invention.
FIG. 6 is a side edge view of the cap of the valve of the invention.
FIG. 7 is a cross-sectional view of the cap along lines 7—7.

The various embodiments of the valve of the invention are described in connection with the drawings as follows:
Inflation Valve Referring to FIG. 1, the invention comprises a low profile valve 10 including as its major components, a body 12, a tethered cap 14 with a one-way flapper 15 connected to its underside, and a tethered dust cap 16. More particularly, referring now to FIG. 2, body 12 comprises a generally cylindrical design defined by annular wall 18 and a lower wall 20. A sealing flange 22 is annularly formed about the outer surface 24 of the annular wall 18. The sealing flange 22 provides a means for connecting, such as by adhesive, heat sealing or RF sealing, the sealing flange 22 to an article (not shown) to which the valve 10 is to be connected such as an air-filled article (e.g., inflatable boat or personal floatation device), a fluid-filled device article (e.g., a waterbed), or the like.

The inner surface or lumen 26 of the annular wall 18 comprises a plurality of threads 28 extending from the upper edge 30 of the annular wall 18 to along the lumen 26 to near or adjacent the lower edge 32 of the annular wall 18. The lower wall 20 comprises a large-diameter center hole 34 to allow passage of the fluid (e.g., water or air) from the outside into the article to which the valve 10 is connected. A plurality of radial ridges 36 are formed within the outer surface 38 of the lower wall 20 so as to prevent inadvertent sealing of the outer surface 38 of the body 12 to the material of the article to be inflated that would otherwise obstruct or compromise the free flow of fluid through the valve 10. The inner surface 40 of the lower wall 20 comprises a generally smooth configuration to form a tight seal with the flapper 15 of the cap 14 when fully threaded into the body 12 in a manner more particularly described below. Finally, the outer surface 24 of the annular wall 18 comprises an annular groove 42 about its periphery for providing a means for tethering the cap 14 to the body 12 as described below in greater detail. Preferably, the above-described features of the body 12 are integrally molded together from a semi-rigid material such as polyvinyl chloride (PVC) having a hardness of approximately 93 durometer. Other materials or blends of materials may suffice.

Referring now to FIG. 3–7, the cap 14 of the valve 10 of the invention comprises a generally low-profile design for threaded engagement into the body 12 so as to be substantially flush with the upper edge 30 of the annular wall 18. More particularly, cap 14 comprises a generally circular cylindrical configuration having an annular wall 50 with external threads 52 of substantially the same pitch and design as the threads 28 of the annular wall 18 of the body 12 so as to threadably engage therein. The length of the annular wall 52 of the cap 14 is appreciably greater than the depth of the annular wall 18 of the body 12 such that the upper edge 54 of the annular wall 50 protrudes slightly from the upper edge 30 of the annular wall 18 of the body 12. The protruding upper edge 54 provides a sufficiently-protruding surface by which the cap 14 may be grasped by a human hand and rotated for threaded engagement into and out of the body 12. Further, the protruding upper edge 54 of the annular wall 50 may comprise a plurality of knurled ridges 56 about a least a portion of its periphery to facilitate grasping of the cap 14 by a human hand.

The cap 14 further comprises a pair of webs 58 and 60 positioned diametrically within the cavity of the annular wall 50 of the cap 14 at right angles to each other. One web 58 comprises a relatively thin design whereas the other web 60 comprises a relatively wide design. The wide web 58 includes a blind slot 62 formed therein. The blind slot 62 conveniently provides a means for tightening and/or loosening the cap 14 from the body by means of a screwdriver, edge of a coin such as a penny, or the like. Preferably, blind slot 62 extends across the diametrical length of the wide web 58 and into the wide web by a significant depth to facilitate the use of a convenient tool such as a coin in the tightening or loosening of the cap 14 within the body 12. Importantly, the inclusion of the blind slot 62 within the wide, web 58 for tightening and loosening of the cap 14 within the body 12, allows the protruding upper edge 54 of the cap 14 to be almost flush with the body 12. For example, the cap 14 may be conveniently threaded into the body 12 by grasping the protruding upper edge 54 and until substantially flush with the body 12, whereupon a coin can be used to turn the cap 14 another quarter turn or so to fully capture the flapper 15 between the cap 14 and the body 12. Conversely, once tightened, the protruding upper edge 54 may not be adequate for sufficiently grasping in order to loosen the cap 14; however, a coin or other tool can be used to loosen the cap 14 from the body 12 whereupon the protruding upper edge 54 may then be conveniently grasped and turned to unthread the cap 14 from the body 12.

The one-way flapper 15 of the cap 14 is best illustrated in FIG. 3A as including a generally circular cylindrical disk-shaped design having a center protrusion 64 with an annular barb 66. The flapper 15 is preferably composed of a resilient material such as neoprene having a hardness of approximately 65 durometer (Shore A). The flapper 15 is connected to the cap 14 by forcing the center protrusion 64 into a center hole 68 formed in the wide web 58. In this regard, center hole 68 coupled with the depth of the blind slot 62, provides sufficient clearance such that the annular barb 66 of the center protrusion 64 may extend about the periphery of the inside edge of the center hole 68 thereby firmly securing the flapper valve 15 to the underside of the cap 14. For added clearance, the blind slot 62 may comprise circular grooves 70 on opposing edges of the opposing walls of the blind slot 62 at its center. It is noted that the webs 58 and 60 preferably extend the full depth of the cap 14 so as to provide mechanical support for the flapper valve 15 during high back pressures to prevent the flapper 15 from being turned inside-out within the cap 14 as could otherwise occur with high back pressure.

The lower edge 72 of the annular wall 50 of the cap 14 preferably comprises an annular seat 74 formed therein. Correspondingly, the outermost diameter of the flapper 15 is substantially equal to the diameter of the annular seat 74 such that the annular edge 76 coincides with the center of the annular seat 74. This alignment assures adequate sealing of the annular edge 76 of the flapper 15 with the annular seat 74 of the lower end 72 of the cap 14. Thus, with the cap 14 loosely threaded into the body 12, inflation of the article is therefore permitted whereas deflation is precluded due to the one-way sealing of the flapper 15 against the annular seat 74. Moreover, once the cap 14 is fully tightened within the body 12, the flapper 15 is captured and squeezed between the annular eat 74 and the inner surface 40 of the lower wall 20 of the body 12, thereby preventing any further inflation (or deflation) of the article.

Both of the webs 58 and 60 extend diametrically across the cavity formed by the annular 50 of the cap 14 as previously described. Being positioned diametrically with each other, the cavity of the cap 14 is divided into four quadrants. However, in order to provide for the free flow of fluid from one quadrant to adjacent quadrants, the webs 58 and 60 preferably comprise slots 78 formed at their outermost edges at the point at which they connect to the inside surface of the annular wall 50 of the cap 14.

The dust cap 16 comprises a generally circular cylindrical design having a generally inverted top-hat configuration defined by annular wall 80 and bottom wall 82. The annular wall 80 comprises an outer diameter substantially equal to the inner diameter of the annular wall 50 of the cap 14 such that the dust cap 16 may be simply snap-fitted therein and protect the flapper 15 of the cap 14 from dust and other debris during use of the article to which the valve 10 is connected. The dust cap 16 is preferably tethered to the cap 14 by means of a resilient tether 84 having a living hinge portion 86.

As noted above, the cap 14 is preferably tethered to the body 12. Such a tether may be accomplished by a conventional inner and outer concentric rings 88 and 90 joined together at one end at a living hinge portion 92 and at the other end, the outer concentric ring 90 being connected to the cap 14 by means of a tether 94 also having a living hinge portion 96. The cap 14 is tethered to the body 12 by resiliently slipping the inner ring 88 into the annular groove 42 of the body 12. Living hinge portion 96 facilitates alignment of the cap 14 with the body 12 during removal and installation whereas living portion 92 interconnecting the rings 88 and 90 allow the cap 14 to be fully removed from the body 12 and moved off to the side away from the body 12.

Preferably, the cap 14, dust cap 16, and tethers 84 and 94 are integrally formed with one another from a resilient material such as polypropylene. Various other materials or blends of materials may suffice. Consequently, once molded as an integrally assembly, the flapper 15 may be quickly installed to the underside thereof and the inner ring 88 may be quickly snapped into the annular groove 42 of the body 12, thereby completing the assembly with minimal manufacturing and assembly costs. Moreover, a low-profile design is achieved that facilitates use of the valve 10 in a greater variety of articles.

Relief Valve

Figure 8:
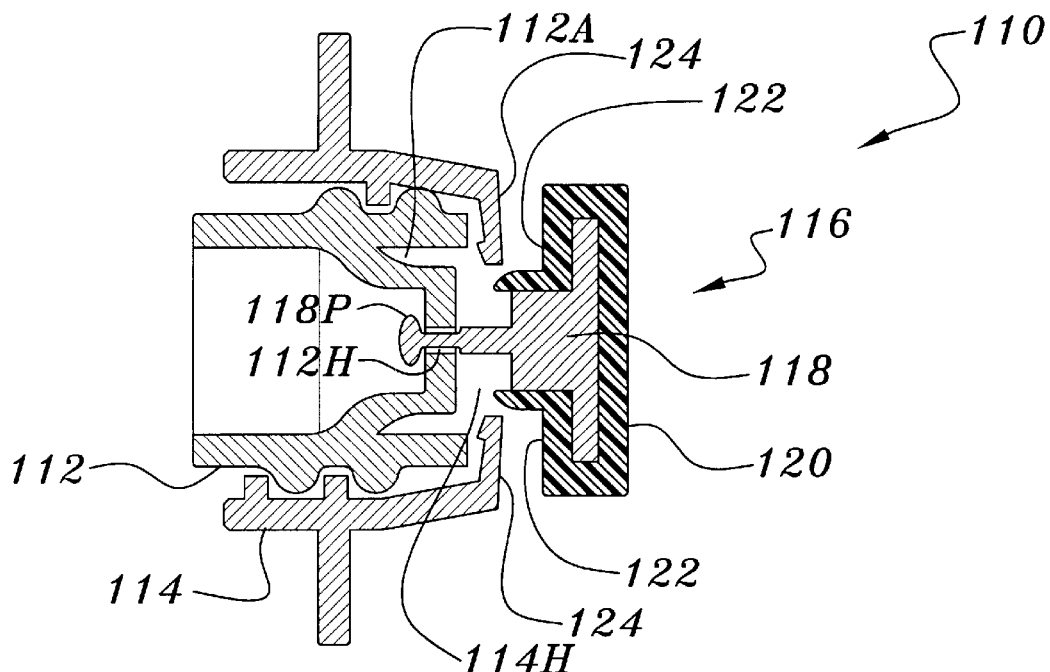
FIGS. 8 and 9 are cross-sectional view of two embodiments of a relief valve that is operable to vent an article to which it is attached by screwing the cap into the body.
Figure 9:
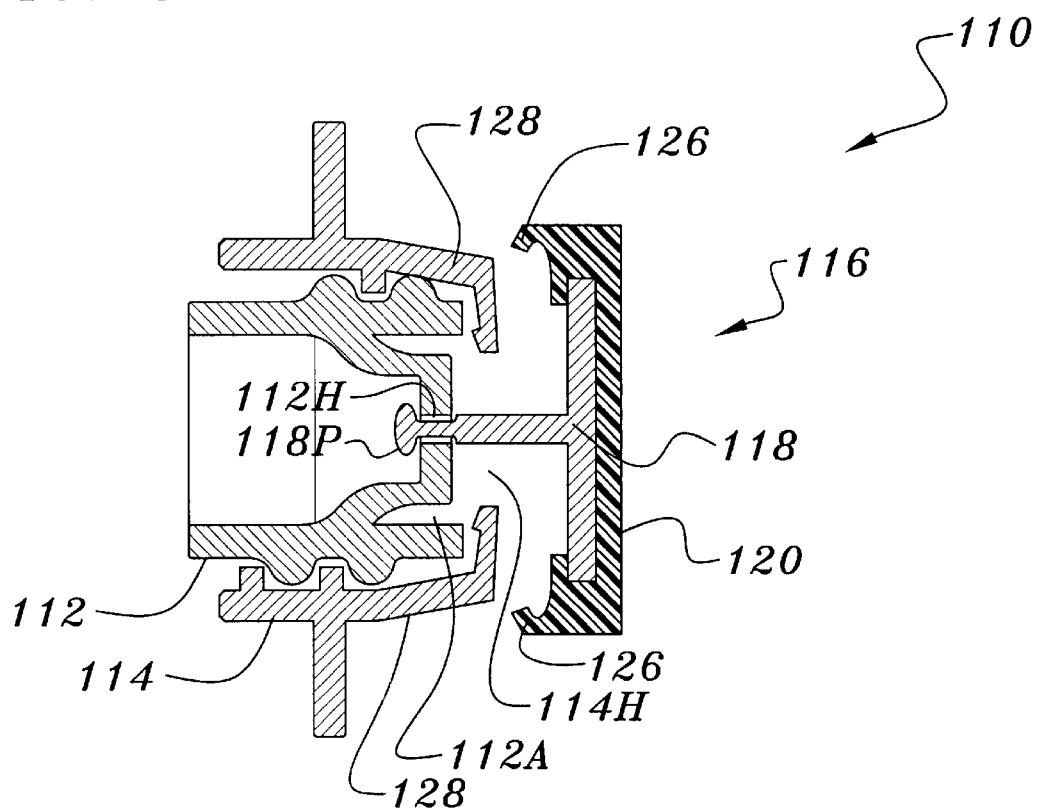
Figure 10:
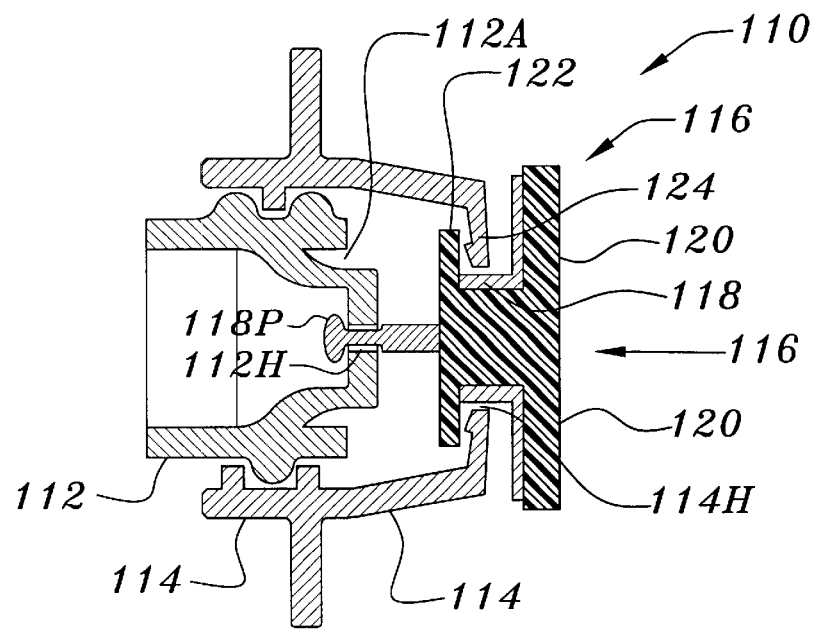
FIG. 10 is a cross-sectional view of another embodiment of a relief valve that is operable to vent an article to which it is attached by screwing the cap out of the body.
Figure 11:
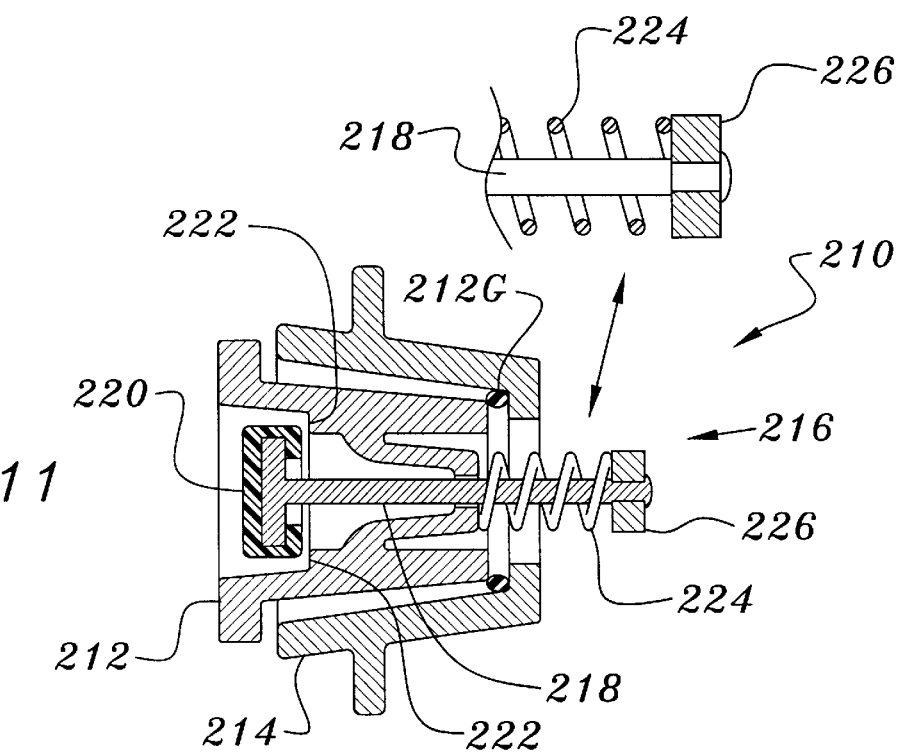
FIG. 11 is a cross-sectional view of a still another embodiment of a relief that functions as a pressure relief valve to vent an article to which it is attached when the pressure exceeds a predetermined amount.

The three embodiments of the relief valve 110 of the invention are illustrated in FIGS. 8–10. In each embodiment, the valves 110 comprise a cap 112 having venting apertures 112A formed therein that screws into and out of a body 114 having a center hole 114H. A relief valve mechanism 116 is composed of a t-shaped piston 118 having a protuberance 118P formed at the end of the piston rod. During assembly, the rod of the t-shaped piston 118 is inserted through the center hole 114H of the body 114 and then the protuberance 118P thereof is snapped into a hole 112H in the bottom of the cap 112. A gasket 120 is fitted over the head of the piston 118. Movement of the cap 112 into and out of the body 114 serves to seal and unseal the gasket 120 of the piston 118 to the body 114 to vent the article to which the relief valve 110 is connected. Due to the particular configuration of the piston 118 of the valve mechanism 116, the relief valve 110 of FIGS. 8 and 9 is operable to relieve pressure within an article to which it is attached by screwing the cap 110 into the body 114 whereas the relief valve 110 in FIG. 10 is operable to relieve pressure within the article to which it is attached by screwing the cap 110 out of the body 114.

More particularly, the relief valve 110 of FIG. 8 comprises a piston 118 having a gasket 120 that includes an inside annular stepped seal portion 122 that seals against the inside lower edge 124 of the body 114 when the cap 112 is screwed out of the body 114 for its full length of travel as determined by the length of the rod of the piston. Similarly, the relief valve of FIG. 9 comprises a piston 118 having a gasket 120 that includes an outer annular seal portion 126 that seals against the outside lower edge 128 of the body 114 when the cap is screwed out of the body 114 for its full length of travel. In both embodiments, as the cap 112 is screwed into the body 114, the seal between the gasket 120 and the edge 124 or 128 of the body 114 is broken to start venting of the article. The amount of venting can be increased by further inward screwing of the cap 112 into the body 114 to further increase the distance between the gasket 120 and the edge 124 or 128 of the body 114. Venting may be stopped by screwing the cap 112 outwardly until the gasket 120 seals once again against the edge 124 or 128.

The relief valve 110 of FIG. 10 also comprises a piston 118 having a gasket 120 that includes an inside annular stopper seal portion 122 that seals against the inside lower edge 124 of the body 114 when the cap 112 is screwed into the body 114. As the cap 112 is screwed out of the body 114, the seal between the gasket 120 and the edge 124 of the body 114 is broken to start venting of the article. The amount of venting can be increased by further outward screwing of the cap 112 from the body 114 to further increase the distance between the gasket 120 and the edge 124 of the body 114. It is noted that the length of travel of the cap 12 from being screwed out of the body 114 is determined by the length of the rod of the piston 118. Venting may be stopped by screwing the cap 112 inwardly until the gasket 120 seals once again against the edge 124.

Pressure Relief Valve

The pressure relief valve 210 of the invention comprises a cap 212 that is threaded into a body 214 and can be sealed therein when fully tightened by means of an o-ring or other gasket 212G. A pressure-relief plunger mechanism 216 is carried by the cap 212. The pressure-relief plunger mechanism 216 comprises t-shaped piston 218 having a gasket 220 fitted over its head portion for sealing with a step 222 formed in the cap 212. A spring 224 is positioned over the rod of the piston 218 between the bottom of the cap 212 and a transverse stop 226 connected to the end of the piston rod. The spring therefore exerts a constant force against the piston rod to constantly urge the gasket 220 into sealing engagement with the step 222 of the cap 212. When the pressure within the article to which the valve 210 is connected exceeds a predetermined amount as determined by the spring constant of the spring 224, the gasket 220 is forcibly unseated from the step 222 to vent the article of excess pressure. It is noted that once the pressure returns to the predetermined amount, the force of the spring 224 returns the gasket 220 to its sealing position with the step 222 of the cap 212. It is also noted that this design advantageously allows the cap 212 to be fully removed from the body 214 for inflation of the article.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A low profile inflation valve for inflating an article, comprising in combination:

a body defined by an annular wall and a lower wall having a center hole formed therein, said annular wall of said body comprising at least one thread, said body further including a sealing flange for facilitating connection of the body to the article;

a cap having an annular wall with at least one external thread formed thereon for threaded engagement with said thread of said body, said cap further including at least one web extending thereacross from one portion of said annular wall to another, said web of said cap including a slot formed therein; and a flapper having a protruding portion for insertion within a hole formed in said web of said cap, said flapper having a peripheral configuration generally corresponding to a lower edge of said annular wall of said cap so as to form a one-way seal therewith when said protrusion of said flapper is positioned within said hole in said web and whereby upon full tightening of said cap within said body, said flapper is captured between said lower edge of said annular wall of said cap and said lower wall of said annular wall of said body to prevent flow of the fluid through said cap.

2. The inflation valve as set forth in claim 1, wherein said slot extends substantially along a length of said web.

3. The inflation valve as set forth in claim 2, wherein said slot comprises a blind slot extending into said web.

4. The inflation valve as set forth in claim 3, wherein said hole into which said protrusion of said flapper is installed, extends into said blind slot.

5. The inflation valve as set forth in claim 4, further including another web extending from a side of said annular wall to another side, said webs being substantially perpendicular to one another.

6. A low profile inflation valve for inflating an article, comprising in combination:

a body defined by an annular wall and a lower wall having a center hole formed therein, said annular wall of said body comprising at least one thread, said body further including a sealing flange for facilitating connection of the body to the article;

a cap having an annular wall with at least one external thread formed thereon for threaded engagement with said thread of said body, said cap further including at least one web extending thereacross from one portion of said annular wall to another, said cap including an upper edge that protrudes slightly above an upper edge of said body when fully threaded therein thereby defining a protruding upper edge portion; and a flapper having a protruding portion for insertion within a hole formed in said web of said cap, said flapper having a peripheral configuration generally corresponding to a lower edge of said annular wall of said cap so as to form a one-way seal therewith when said protrusion of said flapper is positioned within said hole in said web and whereby upon full tightening of said cap within said body, said flapper is captured between said lower edge of said annular wall of said cap and said lower wall of said annular wall of said body to prevent flow of the fluid through said cap.

7. The inflation valve as set forth in claim 6, wherein said protruding upper edge portion of said cap comprises at least one knurled ridge.

8. A low profile inflation valve for inflating an article, comprising in combination:

a body defined by an annular wall and a lower wall having a center hole formed therein, said annular wall of said body comprising at least one thread, said body further including a sealing flange for facilitating connection of the body to the article;

a cap having an annular wall with at least one external thread formed thereon for threaded engagement with said thread of said body, said cap further including at least one web extending thereacross from one portion of said annular wall to another;

a flapper having a protruding portion for insertion within a hole formed in said web of said cap, said flapper having a peripheral configuration generally corresponding to a lower edge of said annular wall of said cap so as to form a one-way seal therewith when said protrusion of said flapper is positioned within said hole in said web and whereby upon full tightening of said cap within said body, said flapper is captured between said lower edge of said annular wall of said cap and said lower wall of said annular wall of said body to prevent flow of the fluid through said cap; and a dust cap having an inverted top-hat configuration that snaps into said annular wall of said cap.

9. The inflation valve as set forth in claim 8, wherein said dust cap is tethered to said cap by means of a living hinge and wherein said cap is tethered to said body by means of concentric inner and outer rings connected together by means of a living hinge, with said inner ring being configured for snap-fitting onto said body.

10. A low profile inflation valve for inflating an article, comprising in combination:

a body defined by an annular wall and a lower wall having a center hole formed therein, said annular wall of said body comprising at least one thread, said body further including a sealing flange for facilitating connection of the body to the article and including a plurality of radial ridges formed on an outside surface of said lower wall of said annular wall of said body;

a cap having an annular wall with at least one external thread formed thereon for threaded engagement with said thread of said body, said cap further including at least one web extending thereacross from one portion of said annular wall to another; and a flapper having a protruding portion for insertion within a hole formed in said web of said cap, said flapper having a peripheral configuration generally corresponding to a lower edge of said annular wall of said cap so as to form a one-way seal therewith when said protrusion of said flapper is positioned within said hole in said web and whereby upon full tightening of said cap within said body, said flapper is captured between said lower edge of said annular wall of said cap and said lower wall of said annular wall of said body to prevent flow of the fluid through said cap.

11. The inflation valve as set forth in claim 1, wherein said web is positioned sufficiently adjacent to said flapper to prevent said flapper from being turned inside-out by back pressure within the article.

12. The inflation valve as set forth in claim 1, wherein said cap is integrally molded in a one-piece configuration and wherein said body is integrally molded in a one-piece configuration.

13. The inflation valve as set forth in claim 12, wherein said body is composed of a sealable material.

* * * * *